(12) United States Patent
Gambrell et al.

(10) Patent No.: US 6,896,122 B2
(45) Date of Patent: May 24, 2005

(54) CHAIN CONVEYOR AND CLIP

(75) Inventors: Michael Lee Gambrell, Birmingham, AL (US); Ray Bradley Tompkins, Bessemer, AL (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/861,735

(22) Filed: Jun. 4, 2004

(65) Prior Publication Data

US 2004/0256200 A1 Dec. 23, 2004

Related U.S. Application Data

(60) Provisional application No. 60/480,323, filed on Jun. 20, 2003.

(51) Int. Cl.[7] ............................................. B65G 17/00
(52) U.S. Cl. ...................................... 198/779; 198/850
(58) Field of Search ................................ 198/779, 850, 198/851, 852, 853

(56) References Cited

U.S. PATENT DOCUMENTS

| | | | | |
|---|---|---|---|---|
| 4,718,543 A | * | 1/1988 | Leisner et al. | 198/779 |
| 5,311,982 A | * | 5/1994 | Clopton | 198/779 |
| 5,344,001 A | * | 9/1994 | Kawaai et al. | 198/779 |
| 6,308,823 B1 | * | 10/2001 | Stevens | 198/850 |

* cited by examiner

Primary Examiner—James R. Bidwell
(74) Attorney, Agent, or Firm—Van Dyke, Gardner, Linn & Burkhart, LLP

(57) ABSTRACT

A chain conveyor includes a plurality of load rollers, a plurality of drive rollers, which are arranged in pairs, and a pair of spaced apart rows of interconnecting linkages aligned generally parallel to the longitudinal axis of the chain conveyor. The load rollers and the drive rollers are rotatably mounted between the linkages with the load rollers positioned between the pairs of drive rollers. The diameter of each load roller is larger than the diameter of each drive roller. The load rollers and the drive rollers are spaced along the longitudinal axis wherein the chain conveyor includes gaps between the outer surfaces of adjacent load rollers and between the outer surfaces of adjacent driver rollers. The chain conveyor further includes a clip, which is supported by the load rollers and includes a substantially rigid body, which has an upper surface spanning between the outer surfaces of adjacent load rollers with a length along the longitudinal axis greater than the gap between the adjacent load rollers to thereby substantially close the gap between the adjacent load rollers. The body also includes a lower surface, which spans between the outer surfaces of adjacent load rollers and has a length along the longitudinal axis greater than the gap between the adjacent load rollers to thereby prevent the clip from being ejected from between the adjacent load rollers.

32 Claims, 3 Drawing Sheets

CHAIN CONVEYOR AND CLIP

This application claims priority from U.S. provisional Pat. Application Ser. No. 60/480,323, filed Jun. 20, 2003, entitled CHAIN CONVEYOR AND CLIP, by Applicants Michael L. Gambrell and Ray B. Tompkins, and is incorporated herein by reference in its entirety.

TECHNICAL FIELD AND BACKGROUND OF THE INVENTION

The present invention relates to a chain conveyor and, more particularly, to a chain conveyor with a protective covering.

Conventional chain conveyors include a plurality of drive rollers and a plurality of load rollers, which are positioned between the drive rollers and, further, which extend above the drive rollers for conveying articles. A chain conveyor is typically extended through an extruded member, which provides support surfaces for the drive rollers and a gap through which the load rollers extend for conveying the articles. Chain conveyors tend to be used in groups of two or more depending on the width and shape of the articles being conveyed. The load rollers have larger diameters than the drive rollers, which results in the load rollers conveying at higher speeds than the speed of the chain itself, which is controlled by the drive rollers. However, in chain conveyors it has been found that when relatively small items, such as bolts, nuts, or the like, become loose during the conveying operation, the articles can get caught between the rollers and, thus, either damage the chain or halt operation.

Several solutions have been proposed. For example, in U.S. Pat. No. 5,311,982, a clip is provided that can be inserted between adjacent rollers of the chain conveyor to prevent debris from getting into the chain and jamming the rollers. The clip includes portions for extending between both the adjacent larger rollers and the adjacent pairs of smaller rollers, which are positioned on either side of the larger rollers. However, over time these clips may lose their resiliency or dust and other debris may accumulate on the clip to increase the friction between the clip and the rollers to cause the clips to pop out.

Another solution, proposed in U.S. Pat. No. 5,344,001, includes a clip that mounts to the linkages that interconnect the large and small rollers. With this arrangement, the likelihood of the clips popping out is reduced; however, these clips tend to reduce the flexibility of the conveyor chain. As noted above, these conventional conveyor chains are typically passed through an extruded member and, further, form a closed loop within the extruded member such that the chain conveyor must be relatively flexible. Hence, when the flexibility of the conveyor chain is reduced, an increase in stresses may occur in the clip.

Accordingly, there is a need for a cover or clip that will reduce the chances of debris entering and jamming the chain conveyor while reducing the likelihood of the clip being damaged or being ejected from the chain conveyor.

SUMMARY

Accordingly, the present invention provides a conveyor chain and clip that provides a cover between the load carrying rollers of the chain conveyor, which prevents debris from entering the chain conveyor and, further, is adapted to reduce the chances of the clip being ejected from between the load rollers, while also being configured to have minimal impact on the flexibility of the chain conveyor.

In one form of the invention, a chain conveyor includes a plurality of load rollers, a plurality of drive rollers, and a pair of spaced apart rows of interconnecting linkages, which are aligned generally parallel to the longitudinal axis of the chain conveyor. The load rollers and the drive rollers are rotatably mounted between the linkages, with the load rollers positioned between pairs of the drive rollers. The diameter of each of the load roller is larger than the diameter of each of the drive rollers, with the load rollers and the drive rollers being spaced along the longitudinal axis wherein the chain conveyor includes gaps between the outer surfaces of adjacent load rollers and between the outer surfaces of adjacent driver rollers. A clip is supported by the load rollers and includes a substantially rigid body, with an upper surface spanning between the outer surfaces of adjacent load rollers and having a length along the longitudinal axis of the chain conveyor that is greater than the gap between the adjacent load rollers to thereby substantially close the gap between the adjacent load rollers. The body has a lower surface that spans between the outer surfaces of adjacent load rollers and has a length along the longitudinal axis of the chain conveyor greater than the gap between the adjacent load rollers to thereby prevent the clip from being ejected from between the adjacent load rollers.

In one aspect, the body of the clip includes a pair of projecting tabs, which straddle the adjacent load rollers to thereby generally align the upper surface of the body between the adjacent load rollers. In preferred form, each of the tabs includes a longitudinal extent extending generally parallel to the longitudinal axis of the chain conveyor. The longitudinal extents each have terminal ends, which are spaced inwardly from the outer surfaces of adjacent drive rollers. Alternately, or in addition, each of the longitudinal extents of the tabs has a length less than the length of the upper surface of the body of the clip.

According to yet another aspect, each of the tabs includes an upper surface, with the upper surfaces of the tabs being positioned below the upper surfaces of the load rollers.

In yet another aspect, the body of the clip has a forward side, a rearward side, and left and right sides. The forward and rearward sides face the load rollers and generally following the outer surfaces of the load rollers. Further, the forward and rearward sides are spaced along the longitudinal axis of the chain conveyor and interconnected by the left and right sides. In a further aspect, the left and right sides are substantially planar. Similarly, the upper and lower surfaces of the body of the clip may be planar.

In another form of the invention, the chain conveyor includes a plurality of load rollers, a plurality of drive rollers, and spaced apart rows of interconnecting linkages aligned generally parallel to the longitudinal axis of the chain conveyor. The load rollers and the drive rollers are rotatably mounted between the linkages with the load rollers positioned between pairs of the drive rollers similar to the chain conveyor noted above. The chain conveyor further includes a clip that comprises a substantially rigid body that is positioned between the adjacent load rollers and adapted to be secured in the chain conveyor. The body has an upper surface that spans between the outer surfaces of adjacent load rollers and has a length along the longitudinal axis greater than the gap between the adjacent rollers to thereby substantially close the gap between the adjacent load rollers. The body of the clip includes a pair of projecting tabs, which straddle the adjacent load rollers to thereby generally center the clip in the chain conveyor and generally align the upper surface of the clip between the adjacent load rollers. Each of the tabs includes a longitudinal extent extending generally parallel to the longitudinal axis of the chain conveyor, with each of the longitudinal extents having terminal ends, and the terminal ends being spaced inwardly from the outer surfaces of the adjacent drive rollers.

In one aspect, the clip is supported by the load rollers. In other aspects, each of the tabs includes an upper surface that is lower than the upper surface of the body. In addition, the upper surfaces of the tabs are preferably above the upper surfaces of the drive rollers.

In another aspect, the body of the clip includes a lower surface, which has a length along the longitudinal axis of the chain conveyor that is greater than the gap between the adjacent load rollers and spans between the outer surfaces of the adjacent load rollers.

According to yet another aspect, the body of the clip comprises a substantially solid body. For example, the body may comprise a plastic body.

According to yet another form of the invention, the chain conveyor includes a plurality of load rollers, a plurality of drive rollers, and spaced apart rows of interconnecting linkages as noted above. The chain conveyor also includes a clip. The clip includes a body, which is positioned between the adjacent load rollers and is adapted to be secured in the chain conveyor. The body has an upper surface that extends between the outer surfaces of adjacent load rollers and has a length along the longitudinal axis greater than the gap between the adjacent rollers to thereby substantially close the gap between the adjacent load rollers. In addition, the body includes a pair of projecting tabs, which straddle the adjacent load rollers to thereby generally align the upper surface between the adjacent load rollers. Each of the tabs includes terminal ends spaced along the longitudinal axis, which are spaced inwardly from the outer edges of the upper surface of the body of the clip.

In yet another form of the invention, a clip for a chain conveyor includes a substantially rigid body that has forward and rearward sides for facing load rollers and left and right sides generally orthogonal to the forward and rearward sides. The forward and rearward sides are curved for generally following the outer surfaces of the load rollers. The left and right sides are substantially planar and span between the forward and rearward sides. The body further has an upper surface and a lower surface, with the upper and lower surfaces spanning between the forward and rearward sides and between the left and right sides so that when the clip is positioned between adjacent load rollers, the clip will cover the gap between adjacent load rollers and will resist being ejected from between adjacent load rollers. In addition, the body including a pair of projecting tabs, which project from the left and right sides, for straddling adjacent load rollers for generally aligning the clip between the load rollers.

In one aspect, each of the tabs includes a longitudinal extent for extending generally parallel to the longitudinal axis of the chain conveyor. Each of the longitudinal extents has terminal ends, which are spaced inwardly from outer edges of the upper surface of the body. Alternately or in addition, the terminal ends are spaced inwardly from the outer surfaces of the drive rollers to thereby reduce the interference between the clip and the drive rollers and, further, reduce the impact on the flexibility of the chain conveyor.

In another aspect, each of the upper and lower surfaces has a length, which extends from the rearward side to the forward side, with the length of the upper side being greater than the lower side.

Accordingly, the present invention provides a chain conveyor and clip that reduces the risk of small items from getting trapped in the chain conveyor and, further, that is adapted to resist being ejected from between the rollers while minimizing the impact on the flexibility of the chain conveyor.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
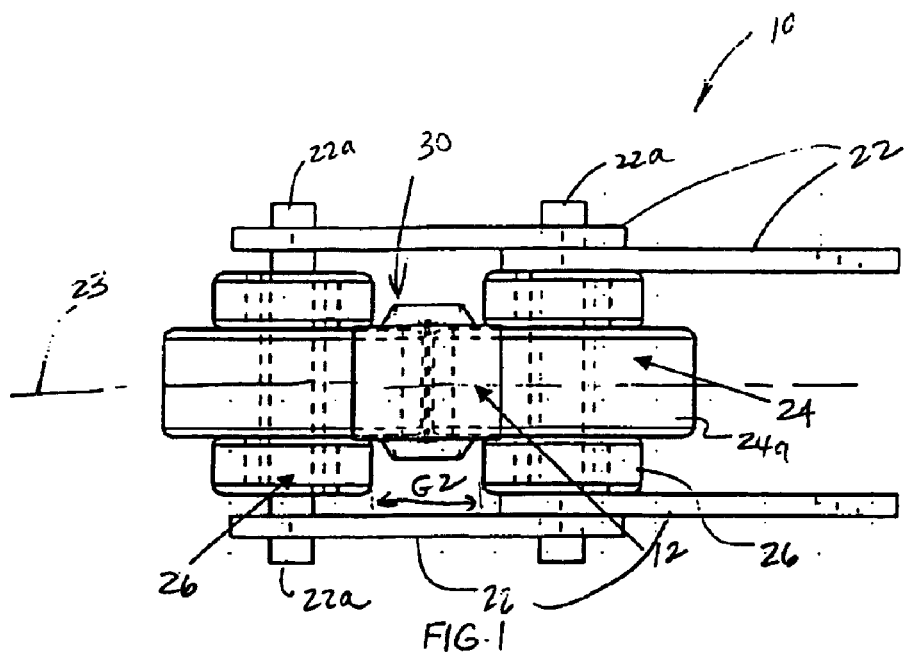
FIG. 1 is a plan view of a chain conveyor incorporating a clip of the present invention.

Referring to FIGS. 1–7, the numeral 10 generally designates a chain conveyor of the present invention. As will be more fully described below, chain conveyor 10 incorporates a plurality of clips 12 that reduces the risk of small items from being caught or trapped in the chain conveyor while minimizing the impact on the flexibility of chain conveyor 10. As best understood from FIG. 3, chain conveyor 10 is typically extended through an extruded member 14 and, more particularly, extended through an upper run 16 of extruded member 14 for conveying an article A along a conveying axis 18 using load rollers 24, described more fully below. Chain conveyor 10 preferably forms a closed loop within extruded member 14 and on its return path extends through lower run 20 to form the closed loop through extruded member 14. As would be understood by those skilled in the art, chain conveyor 10 is driven by a sprocket drive assembly (not shown).

Figure 2:
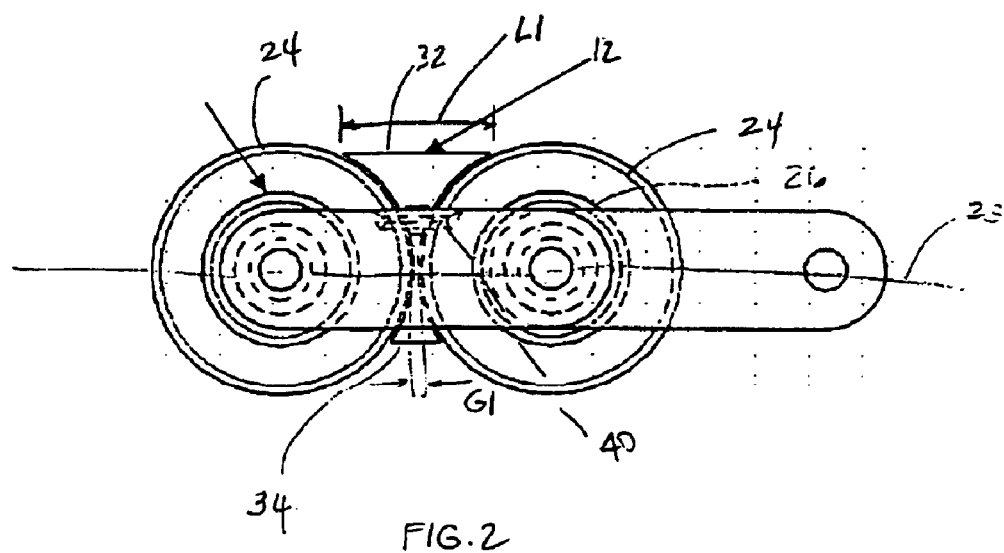
FIG. 2 is a side elevation view of the chain conveyor of FIG. 1.
Figure 3:
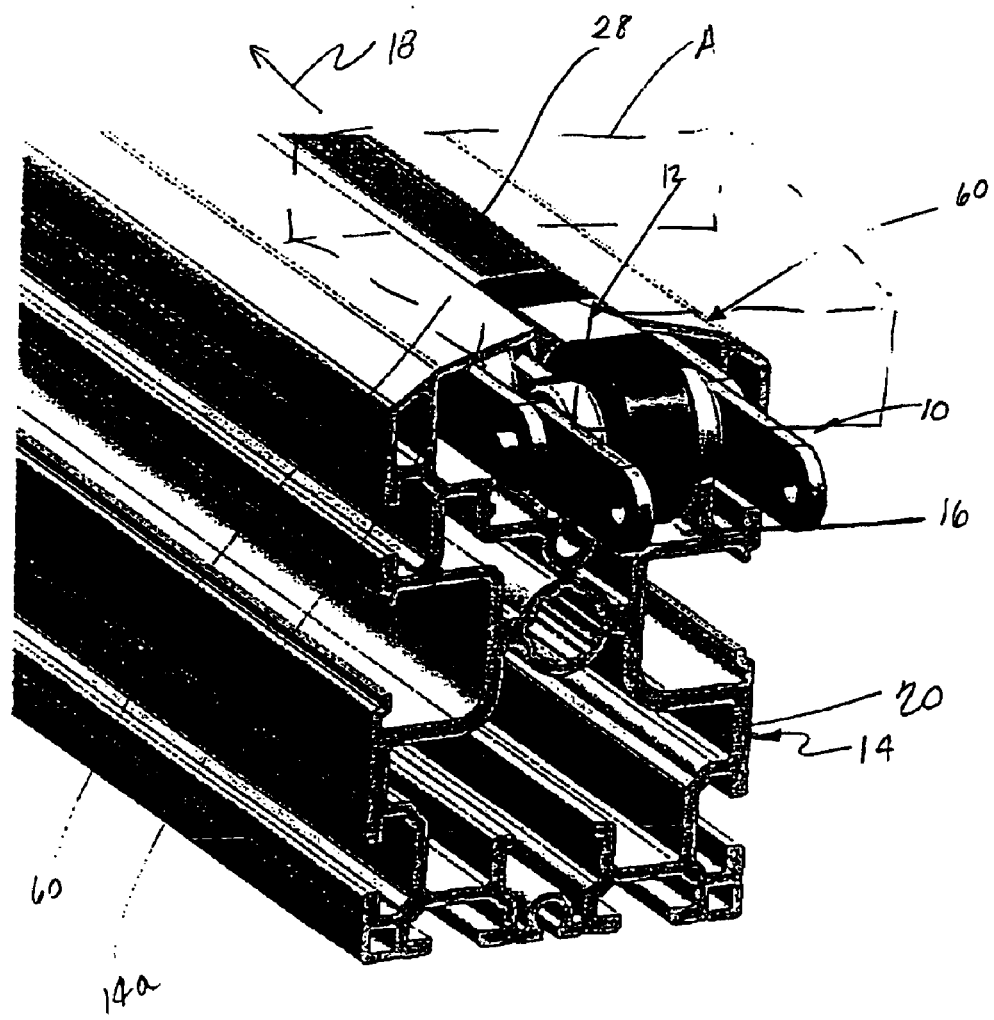
FIG. 3 is a cross-section of a conveyor tread comprising a conveyor extrusion incorporating the chain conveyor and clip of the present invention.

As best seen in FIGS. 1 and 2, chain conveyor 10 includes a plurality of linkages 22 that are interconnected by pins 22a and arranged in a spaced relationship, generally parallel to the longitudinal axis 23 of chain conveyor 10. Mounted on pins 22a between linkages 22 are a plurality of load rollers 24 and drive rollers 26. Each load roller 24 is commonly mounted with and positioned between a pair of drive rollers and is generally aligned along longitudinal axis 23 of chain conveyor 10. Load rollers 24 and drive rollers 26 are rotatably supported between their respective linkages on pins 22a, with each drive roller 26 having an outer diameter less than the outer diameters of load rollers 24 so that when drive rollers 26 are driven along the horizontal support surfaces (provided internally of extruded member 14), the conveying speed of load rollers 24 is faster than the speed of chain conveyor 10 through extruded member 14, as is commonly known to those of ordinary skill in the art. As best seen in FIG. 3, load rollers 24 project through a gap 28 provided in extruded member 14 and above the upper surface of extruded member 14 to thereby provide a conveying surface above extruded member 14 and for conveying article A along conveying axis 18, as previously noted.

As noted above, chain conveyor 10 incorporates a plurality of clips 12 that reduce the risk of debris from entering chain conveyor 10 as it passes along gap 28 of extruded member 14, while minimizing the impact on the flexibility of chain conveyor 10. In addition, clips 12 are configured so that they do not fall out from chain conveyor 10, for example, when chain conveyor 10 is bent on its return path or while it is inverted in the lower run of extruded member 14. As best seen in FIG. 2, each clip 12 includes a generally hourglass-shaped body 30 that includes an upper surface 32 and a lower surface 34. In the illustrated embodiments, upper and lower surfaces 32 and 34 are substantially planar; however, it can be appreciated that either one or both of the surfaces may be arcuate surfaces, such as concave surfaces. Upper surface 32 extends between adjacent load rollers 24 and preferably spans between the respective outer surfaces of the adjacent rollers to essentially close the gap G1 between the adjacent load rollers. As would be understood, therefore, upper surface 32 has a longitudinal length L1 (FIG. 2), which is aligned along axis 23, that is longer than the gap G1 between the adjacent load rollers and, further, that is greater than the gap G2 between the adjacent drive rollers.

As best seen in FIG. 3, upper surface 32 of clip 12 is substantially aligned with the upper surface 14a of extruded member 14 such that clip 12 covers the space in gap 28 and the gap between the adjacent load rollers to reduce the likelihood, if not prevent, debris from entering chain conveyor 10 as chain conveyor 10 passes through extruded member 14. Lower surface 34 of body 30 similarly includes a longitudinal length L2 (FIG. 6), which is aligned along longitudinal axis 23, that is greater than gap G1 formed between adjacent load rollers 24. In this manner, the shape of body 30 retains clip 12 between the load rollers. Furthermore, body 30 comprises a generally rigid body; therefore, when clip 12 is positioned between load rollers 24, for example during the assembly of chain conveyor 10, clip 12 is retained between the respective load rollers and, further, resists ejection from between the load rollers 24 by virtue of its substantially rigid, generally hourglass shape.

Figure 5:
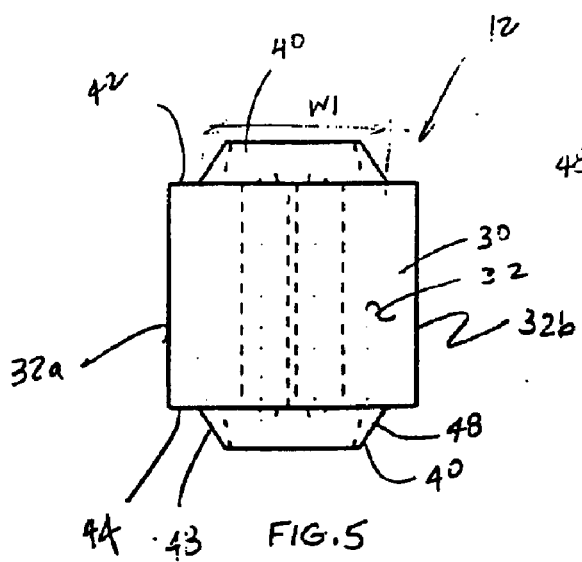
FIG. 5 is a top plan view of the clip of FIG. 4.
Figure 4:
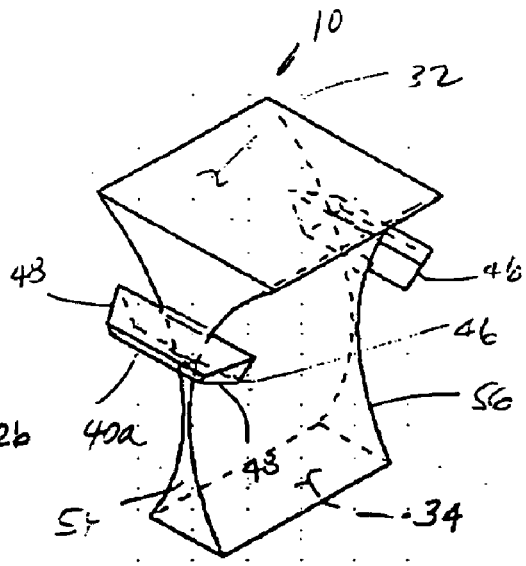
FIG. 4 is a perspective view of the clip of the chain conveyor of the present invention.
Figure 6:
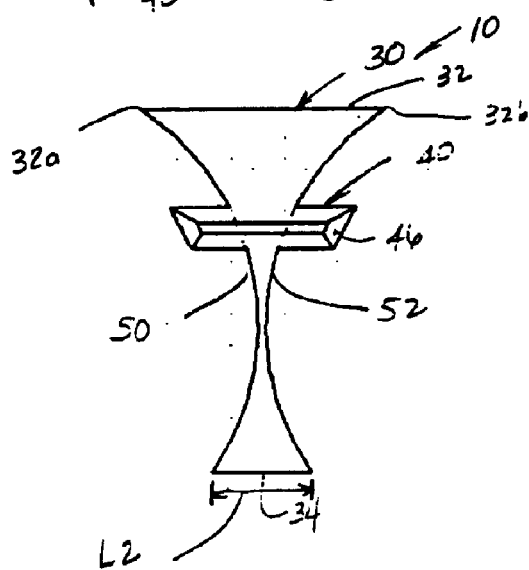
FIG. 6 is a side elevation view of the clip of FIG. 4.
Figure 7:
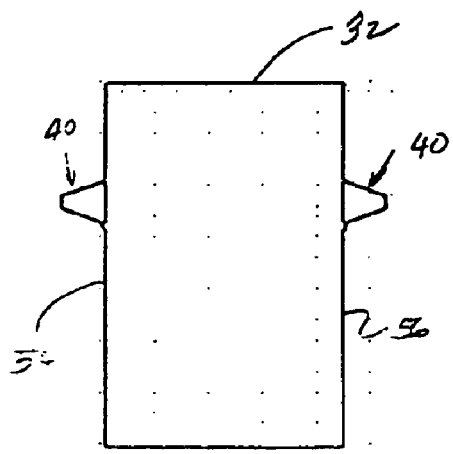
FIG. 7 is a forward or rearward end view of the clip of FIG. 4.

Referring to FIGS. 5–7, clip 12 includes a pair of projecting tabs 40, which extend from opposed left and right sides 42 and 44 (as viewed in FIG. 5) of body 30 and, further, project outwardly or laterally with respect to forward and rearward sides 50 and 52. As best seen in FIG. 2, tabs 40 straddle load rollers 24 to generally center clip 12 in chain conveyor 10 and generally align upper surface 32 between load rollers 24. As best seen in FIG. 4, tabs 40 have a wedge-shaped cross-section 46 and, further, have terminal ends 48 that are spaced inwardly from outer edges 32a and 32b, for example, forward and rearward edges, of upper surface 32 of body 30. In addition, referring again to FIG. 1, terminal ends 48 are spaced inwardly from the outer surfaces of adjacent drive rollers 26 such that tabs 40 do not generally make contact with drive rollers 26 (at least when chain conveyor 10 is in a straight run, such as in the upper or lower run of extruded member 14).

As best understood from FIGS. 4 and 6 and as noted above, body 30 has a generally hourglass shape that is defined by forward and rearward surfaces 50 and 52, which are curved to generally match the outer diameter of load rollers 24. Furthermore, as previously noted, lower surface 34 is sized such that the lower portion or body 30 retains clip 10 between adjacent load rollers 24. In addition, clip 10 is preferably formed from a relatively low friction, substantially rigid material, such as plastic. Optionally, body 30 may comprise a hollow or solid body that is defined by left and right surfaces 54 and 56, forward and rearward surfaces 50 and 52, and upper and lower surfaces (or sides) 32 and 34.

As best seen in FIG. 7, surfaces 54, 56 comprise planar surfaces. Similarly, as noted in the illustrated embodiment upper surface 32 and lower surface 34 are planar surfaces; however, surfaces 32 and 34 may be non-planar surfaces, such as curved surfaces.

As will be understood from FIGS. 1 and 2, clip 12 is, therefore, supported solely by adjacent load rollers 24. Despite the relatively close relationship or contact between forward and rearward facing surfaces 50 and 52 and outer surfaces 24a of load rollers 24, clip 12 remains positioned between the respective load rollers 24 by virtue of its hourglass shape and, further, by its substantially rigid hourglass shape. As noted in reference to FIG. 3, upper surface 32 of clip 12 is generally aligned with upper surface 14a of extruded member 14. Furthermore, upper surfaces 40a of tabs 40 are spaced below the lower surface 60a of web 60 of extruded member 14. However, it should be appreciated that the position of tabs 40 may be adjusted provided the respective upper surfaces 40a are below lower surface 60a of web 60. However, tabs 40 are preferably positioned above the longitudinal axis 23 so as to not interfere with the driving of chain conveyor 10, which is typically driven by a sprocket drive arrangement as noted above, with its sprockets extending between the respective drive rollers.

While several forms of the invention have been shown and described, other forms will now be apparent to those skilled in the art. Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

What is claimed is:

1. A chain conveyor comprising:

a plurality of load rollers, each of said load rollers having a diameter and an outer surface;

a plurality of drive rollers, each of said drive rollers having a diameter and an outer surface, and said plurality of drive rollers arranged in pairs;

said chain conveyor having a longitudinal axis;

a pair of spaced apart rows of interconnecting linkages aligned generally parallel to said longitudinal axis, said load rollers and said drive rollers rotatably mounted between said linkages with said load rollers positioned between said pairs of said drive rollers, said diameter of each of said load roller being larger than said diameter of each of said drive rollers, said load rollers and said drive rollers being spaced along said longitudinal axis wherein said chain conveyor includes gaps between said outer surfaces of adjacent load rollers and between said outer surfaces of adjacent driver rollers; and a clip, said clip being supported by said load rollers and comprising:

a substantially rigid body, said body having an upper surface spanning between said outer surfaces of adjacent load rollers and having a length along said longitudinal axis greater than said gap between said adjacent load rollers to thereby substantially close said gap between said adjacent load rollers, said body having a lower portion with a lower surface spanning between said outer surfaces of adjacent load rollers and having a length along said longitudinal axis greater than said gap between said adjacent load rollers and being preinstalled in said chain whereby said clip is prevented from being ejected from between said adjacent load rollers.

2. The chain conveyor according to claim 1, wherein said body of said clip includes a pair of projecting tabs, said tabs straddling said adjacent load rollers to thereby generally align said upper surface between said adjacent load rollers.

3. The chain conveyor according to claim 2, wherein each of said tabs includes a longitudinal extent extending generally parallel to said longitudinal axis, said longitudinal extents having terminal ends, said terminal ends spaced inwardly from said outer surfaces of adjacent drive rollers.

4. The chain conveyor according to claim 2, wherein each of said tabs includes a wedge-shaped cross-section.

5. The chain conveyor according to claim 2, wherein each of said tabs includes an upper surface, said upper surfaces of said tabs being positioned below said upper surfaces of said load rollers.

6. The chain conveyor according to claim 2, wherein each of said tabs includes a longitudinal extent extending generally parallel to said longitudinal axis, each of said longitudinal extents of said tabs having a length less than said length of said upper surface of said body of said clip.

7. The chain conveyor according to claim 1, wherein said body has a forward surface, a rearward surface, and left and right surfaces, said forward and reward surfaces facing said load rollers and generally following the outer surfaces of said load rollers.

8. The chain conveyor according to claim 7, wherein said forward and rearward surfaces are spaced along said longitudinal axis and interconnected by said left and right surfaces.

9. The chain conveyor according to claim 8, wherein said left and right surfaces are substantially planar.

10. A chain conveyor comprising:
a plurality of load rollers, each of said load rollers having a diameter and an outer surface;
a plurality of drive rollers, each of said drive rollers having a diameter and an outer surface, and said plurality of drive rollers arranged in pairs;
said chain conveyor having a longitudinal axis;
spaced apart rows of interconnecting linkages aligned generally parallel to said longitudinal axis, said load rollers and said drive rollers rotatably mounted between said linkages with said load rollers positioned between pairs of said drive rollers, said diameter of each of said load roller being larger than said diameter of each of said drive rollers, said load rollers and said drive rollers being spaced along said longitudinal axis wherein said chain conveyor includes gaps between said outer surfaces of said adjacent load rollers and between said outer surfaces of adjacent driver rollers; and
a clip comprising:
a substantially rigid body, said body positioned between said adjacent load rollers and adapted to be secured in said chain conveyor, said body having an upper surface spanning between said outer surfaces of adjacent load rollers and having a length along said longitudinal axis greater than said gap between said adjacent rollers to thereby substantially close said gap between said adjacent load rollers, wherein said body of said clip includes a pair of projecting tabs, said tabs straddling said adjacent load rollers to thereby generally align said upper surface between said adjacent load rollers, each of said tabs including a longitudinal extent extending generally parallel to said longitudinal axis, said longitudinal extents having terminal ends, and said terminal ends spaced inwardly from said outer surfaces of said adjacent drive rollers.

11. The chain conveyor according to claim 10, wherein said clip is supported by said load rollers.

12. The chain conveyor according to claim 10, wherein each of said tabs includes a wedge-shaped cross-section.

13. The chain conveyor according to claim 10, wherein each of said tabs includes an upper surface, said upper surfaces of said tabs being lower than said upper surface of said body.

14. The chain conveyor according to claim 13, wherein said upper surfaces of said tabs are above said upper surfaces of said drive rollers.

15. The chain conveyor according to claim 10, wherein said body of said clip includes a lower surface, said lower surface having a length along said longitudinal axis greater than said gap between said adjacent load rollers and spanning between said outer surfaces of said adjacent load rollers.

16. The chain conveyor according to claim 10, wherein said body includes spaced apart forward and rearward surfaces and spaced apart left and right surfaces generally orthogonal to said forward and rearward surfaces, said forward and rearward surfaces facing said load rollers, and said left and right surfaces being generally planar.

17. The chain conveyor according to claim 16, wherein said forward and rearward surfaces are curved to generally follow the outer surfaces of said load rollers.

18. The chain conveyor according to claim 10, wherein said body of said clip comprises a substantially solid body.

19. The chain conveyor according to claim 18, wherein said body comprises a plastic body.

20. A chain conveyor comprising:
a plurality of load rollers, each of said load rollers having a diameter and an outer surface;
a plurality of drive rollers, each of said drive rollers having a diameter and an outer surface, and said plurality of drive rollers arranged in pairs;
spaced apart rows of interconnecting linkages aligned along a longitudinal axis, said load rollers and said drive rollers rotatably mounted between said linkages with said load rollers positioned between pairs of said drive rollers, said diameter of each of said load roller being larger than said diameter of each of said drive rollers, said load rollers and said drive rollers being spaced along said longitudinal axis wherein said chain conveyor includes gaps between said outer surfaces of said adjacent load rollers and between said outer surfaces of adjacent driver rollers; and
a clip comprising:
a body, said body being positioned between said adjacent load rollers and adapted to be secured in said chain conveyor, said body having an upper surface extending between said outer surfaces of adjacent load rollers and having a length along said longitudinal axis greater than said gap between said adjacent rollers to thereby substantially close said gap between said adjacent load rollers, said upper surface having outer edges adjacent said load rollers, said body including a pair of projecting tabs, said tabs straddling said adjacent load rollers to thereby generally align said upper surface between said adjacent load rollers, each of said tabs including terminal ends spaced along said longitudinal axis, and said terminal ends spaced inwardly from said outer edges of said upper surface of said body.

21. The chain conveyor according to claim 20, wherein said terminal ends are spaced inwardly from said outer surfaces of adjacent drive rollers.

22. The chain conveyor according to claim 20, wherein said body comprises a substantially rigid body.

23. The chain conveyor according to claim 22, wherein said body comprises a plastic body.

24. The chain conveyor according to claim 22, wherein said body comprises a solid body.

25. The chain conveyor according to claim 20, wherein said body has a lower surface, said lower surface having a length along said longitudinal axis for extending between the load rollers, said length being dimensioned for covering the gap between the load rollers to prevent the clip from popping out from between the load rollers.

26. A clip for a chain conveyor, the chain conveyor including a plurality of load rollers, each of the load rollers having a diameter and an outer surface, a plurality of drive rollers arranged in pairs, each of the drive rollers having a diameter and an outer surface and, spaced apart rows of interconnecting linkages aligned along a longitudinal axis, the load rollers and the drive rollers rotatably mounted between the linkages with the load rollers positioned between the pairs of the drive rollers, the diameter of each of the load roller being larger than the diameter of each of the drive rollers, the load rollers and the drive rollers being spaced along the longitudinal axis wherein the chain conveyor includes gaps between the outer surfaces of adjacent load rollers and between the outer surfaces of adjacent driver rollers, said clip comprising:

a substantially rigid body, said body having forward and rearward surfaces for facing the load rollers and left and right surfaces generally orthogonal to said forward and rearward surfaces;

said forward and rearward surfaces being curved for generally following the outer surfaces of the load rollers;

said left and right surfaces being substantially planar and spanning between said forward and rearward surfaces;

said body further having an upper portion with an upper surface and a lower portion with a lower surface, said upper and lower surfaces spanning between said forward and rearward surfaces and between said left and right surfaces, said lower surface being a non-flexible surface and being chosen from a non-flexible planar surface and non-flexible curved surface to thereby prevent said clip from being ejected from between adjacent load rollers; and said body further including a pair of projecting tabs, said projecting tabs projecting from opposed sides of said body for straddling adjacent load rollers for generally aligning the clip between the load rollers.

27. The chain conveyor according to claim 26, wherein each of said tabs includes a longitudinal extent for extending generally parallel to the longitudinal axis of the chain conveyor, said longitudinal extents having terminal ends, and said terminal ends spaced inwardly from outer edges of said upper surface of said body.

28. The chain conveyor according to claim 26 wherein each of said tabs includes a longitudinal extent for extending generally parallel to the longitudinal axis of the chain conveyor, said longitudinal extents having terminal ends, and said terminal ends being configured for being spaced inwardly from the outer surface of the drive rollers.

29. The chain conveyor according to claim 26, wherein said body comprise a solid body.

30. The chain conveyor according to claim 26, wherein said body comprises a plastic body.

31. The chain conveyor according to claim 26, wherein each of said upper and lower surfaces has a length extending from said rearward surface to said forward surface, said length of said upper surface being greater than said lower surface.

32. The chain conveyor according to claim 1, wherein said lower surface comprises a non-flexible lower surface chosen from a non-flexible planar surface and a non-flexible curved surface.

* * * * *